United States Patent [19]

Laimins

[11] Patent Number: 4,482,783
[45] Date of Patent: Nov. 13, 1984

[54] PATIENT WEIGHING SCALE WITH HOIST

[75] Inventor: Eric Laimins, Belmont, Mass.

[73] Assignee: Hottinger Baldwin Measurements, Inc., Framingham, Mass.

[21] Appl. No.: 664,709

[22] Filed: Mar. 8, 1976

[51] Int. Cl.³ .................. G01G 19/14; G01G 3/14
[52] U.S. Cl. ..................................... 177/147; 177/211
[58] Field of Search ................ 177/132, 146, 147, 211

[56] References Cited

U.S. PATENT DOCUMENTS

| | | | |
|---|---|---|---|
| 2,866,059 | 12/1958 | Laimins | 177/211 |
| 2,990,899 | 7/1961 | DeBella | 177/245 UX |
| 3,032,131 | 5/1962 | Schmerl | 177/146 X |
| 3,193,035 | 7/1965 | Ferro | 177/211 X |
| 3,556,237 | 1/1971 | Allison | 177/211 X |
| 3,894,592 | 7/1975 | Andersson et al. | 177/211 X |
| 3,913,690 | 10/1975 | Hutchings et al. | 177/147 X |

OTHER PUBLICATIONS

The Toledo Bed Scale, Printed in U.S.A.-0370 on Form GI-300, Toledo Scale Company of Canada, Windsor, Ontario.

Primary Examiner—George H. Miller, Jr.
Attorney, Agent, or Firm—W. G. Fasse

[57] ABSTRACT

The present patient weighing scale provides an automatic display of the patient's weight in digital form. For this purpose, a stretcher is secured to a cantilever boom through supporting means including two beam type transducers, for example double bending beam transducers, responsive to vertical forces and located in the respective ends of a tubular crossbar. The tubular crossbar is one element in a chain of supporting elements between trhe stretcher and the cantilever boom. The supporting elements include preferably pivots or bearings arranged so that the forces resulting from the weight of the patient extend in parallel to the direction of gravity whereby the transducer measuring axis always coincides with the direction of the gravity vector independently of the boom angle.

10 Claims, 9 Drawing Figures

PATIENT WEIGHING SCALE WITH HOIST

BACKGROUND OF THE INVENTION

The present invention relates to a patient weighing scale, more specifically, to a scale which will provide an automatic display of the patient's weight without the need for any mechanical adjustments during the weighing.

U.S. Pat. No. 3,032,131 describes an elevation adjustable weighing scale for patients which is constructed as a fork lift for adjusting the elevational position of the weighing platform. This known weighing scale includes a mechanical weighing mechanism and is intended for weighing bedridden patients. However, difficulties are encountered in getting the patient onto the platform, especially when the patient is connected to various other medical devices, for example, intravenous feeding means or the like.

In the known device it is necessary to turn the patient on his side and somehow roll him onto the platform if he is to be weighed in a lying down position. Moreover, the nurse must make the mechanical adjustments necessary for ascertaining the weight.

It is also known to employ transducers responsive to stress or pressure loads in connection with weighing mechanisms. Thus, it is known to place one transducer under each of the four legs of a patient's bed. This method has the advantage that the patient does not need to be moved at all. However, the dead weight of the bed and other equipment must be taken into account in order to ascertain the true weight of the patient and this may reduce the accuracy of the ascertained weight, especially since humidity and other factors may change the dead weight.

There are also known in the art various mechanisms for supporting a patient. For example, U.S. Pat. No. 2,544,593 discloses a carriage and lift apparatus for patients, wherein a stretcher may be raised and lowered by mechanical means. Similarly, U.S. Pat. No. 2,792,052 describes an invalid walker and transfer device also capable of manipulating a stretcher, U.S. Pat. No. 3,469,269 describes hospital and ambulance patient handling equipment, wherein the patient may be secured in a sitting harness suspended from a boom. The just described devices are not suitable for weighing a patient.

U.S. Pat. No. 2,866,059 describes a transducer responsive to vertical forces which would be suitable for the present purposes. Such transducers provide electrical signals which are a direct measure of the forces or rather vertical forces involved.

U.S. Pat. Nos. 3,795,284 and 3,876,018 describe patient weighing devices in which a pressure transducer and digital read-out means are used. The entire structure is, however, rather complicated since the weighing structure is integrated into the structure of a hospital bed.

OBJECTS OF THE INVENTION

In view of the foregoing, it is the aim of the invention to achieve the following objects, singly or in combination:

to provide a patient weighing scale which will supply a direct read-out of the patient's weight, preferably in digital form and in response to pushing a button, whereby sources of errors are to be eliminated;

to provide a patient weighing scale which will permit an easy handling of the patient, while simultaneously eliminating any lenghty scale adjustments or the like;

to provide a patient weighing scale wherein the transducers are an integral part of the supporting structure of the scale mechanism and so located that they are protected against undesirable forces and influences;

to locate the transducer in a patient weighing scale in such a manner that the overall height of the structure remains the same as heretofore and wherein any electrical connecting cables and the like are located so as to not interfere with the function and operation of the scale;

to employ transducers responsive to vertical forces which will provide an accurate reading over a wide weight range while simultaneously being relatively insensitive to overloads;

to arrange the stretcher suspending elements in such a manner that the so called gravity vector will not adversely affect the weighing results; and to employ a self contained battery operated digital display unit, which will provide the nurse with a direct reading of the patient's weight, either in pounds or kilograms.

SUMMARY OF THE INVENTION

The invention employs a conventional frame structure with a cantilever boom having a free end as well as a secured end pivoted to the frame structure. Power means, such as hydraulic or pneumatic means, are provided for raising and lowering the cantilever boom. A stretcher is, preferably removably, connected to the free end of the boom by support means which, according to the invention, comprise two beam type transducers such as double bending beam transducer means having a measuring axis extending perpendicularly to the geometrical axis of the beam type transducers which are responsive to a weight on the stretcher. Display, preferably digital display means, are operatively connected to the transducer means for providing a direct weight indication.

In a preferred embodiment, two double bending beam transducers are used which extend horizontally and are responsive to vertical forces. The transducers are recessed in a tubular member for protection, but the free ends of the transducers extend out of the tubular member and hoops connect the free ends of the transducers to the stretcher. Preferably, there are arranged bearing means in the chain of supporting or rather suspending elements between the stretcher and the free end of the cantilever boom in order to assure that the transducer measuring axis always coincides with the direction of the gravity vector independently of the boom angle. Such bearing means are not necessary where the boom is raised and lowered vertically up and down without any pivoting movement or where the pivoting movement is through a rather narrow angular range. In any event, the bearing means may be inserted between the free end of the boom and the tubular member containing the transducers of the bearing means may be arranged between the tubular member and the transducer or even between the transducer and the hoops connected to the stretcher.

BRIEF FIGURE DESCRIPTION

In order that the invention may be clearly understood, it will now be described, by way of example, with reference to the accompanying drawings, wherein.

DETAILED DESCRIPTION OF PREFERRED EMBODIMENTS

Figure 1:
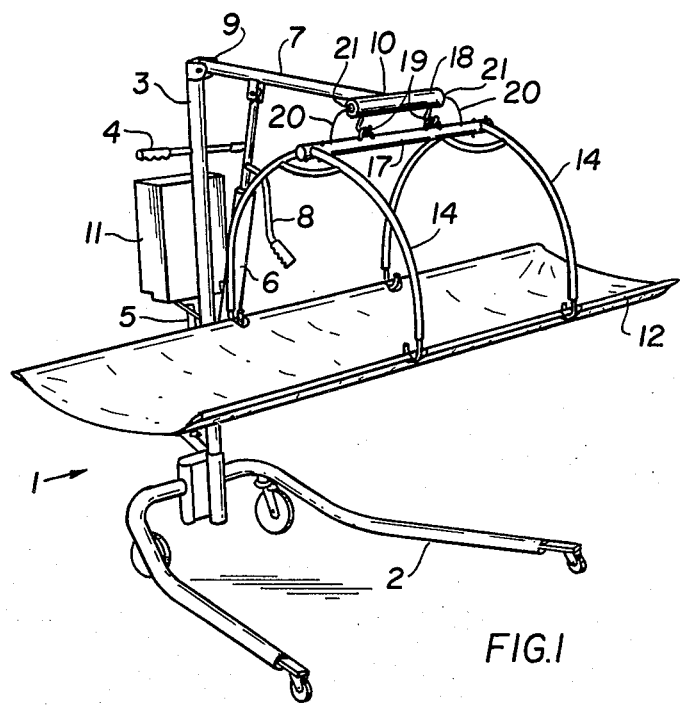
FIG. 1 illustrates a perspective view of a patient weighing scale according to the invention.

FIG. 1 illustrates a patient weighing scale according to the invention, including a frame structure 1 having a caster supported base 2 and an upright post 3. A handle 4 extends through the post 3. A shifting handle 5 of conventional design permits the adjustment of the base 2. A hydraulic or pneumatic jack 6 or the like is operatively interposed between the post 3 and the cantilever boom 7. By operating the pump handle 8 it is possible to raise and lower the boom 7, since its secured end 9 is pivoted to the post 3.

A read-out console 11 is secured to the post 3 and electrically connected to the transducers to be described in more detail below. The display console 11 is of conventional construction and preferably of the digital display type. Such displays are shelf items and may, for example, be purchased from "Netronics, Inc. 15 Broad Street, Hudson, Mass. 01749", the type number "Digital Strain Gauge Display, PWS 101" is suitable for the present purposes.

Figure 2:
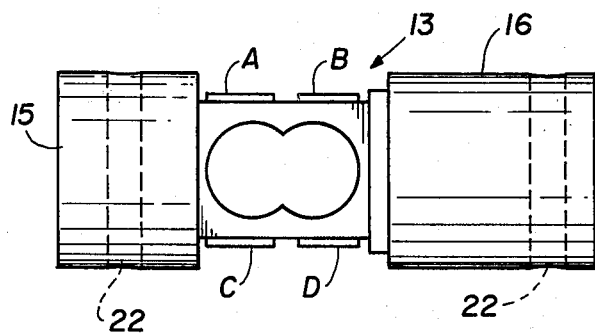
FIG. 2 illustrates a conventional transducer suitable for use in accordance with the invention.

According to the invention, the stretcher 12 is secured to the free end 10 of the cantilever boom 7 by substantially horizontally extending support means including double bending beam transducers 13 which are for example double bending beam transducers as shown in FIG. 2. U.S. Pat. No. 2,866,059 discloses transducers suitable for the present purposes. Such transducers are responsive to vertical forces which extend perpendicularly to the normally horizontally arranged geometrical axis of such beam type transducers.

The stretcher 12 is removably secured to hoops or bails 14 which in turn are connected to the outer free end 15 of respective transducers 13 having inner ends 16 located inside a tubular horizontal crossbar 17. The crossbar 17 in turn is connected to a further horizontal tubular member 18, for example, by releasable hook and eye means 19. The electrical connecting cables 20 of the transducers extend first inside the tubular crossbar 17 and are connected to the display console 11 through cables extending inside the boom 7 and the post 3. For this purpose, there is preferably provided an electrical plug-in connection 21 at each end of the tubular member 18.

Figure 4:
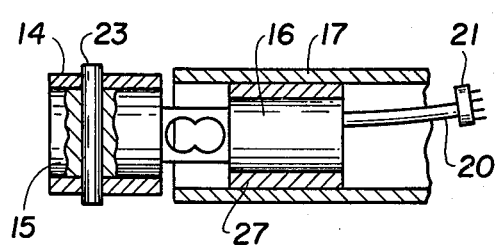
FIG. 4 illustrates a sectional view through a transducer rotatably secured with one end thereof inside a tubular member.

Referring to FIG. 2, the strain gauge transducer employed according to the invention is provided with the above mentioned inner end 16 and the outer end 15. Each end is provided with a respective hole 22 for securing the transducer ends to the respective structural elements. Thus, the free end 15 may be connected to the hoops 14 and the inner end 16 of the transducer may be connected to the tubular crossbar 17 by means of pins extending through the holes 22 and through the hoops or tubular member respectively. Such pins 23 are, for example, shown in FIGS. 4 and 5.

Figure 3:
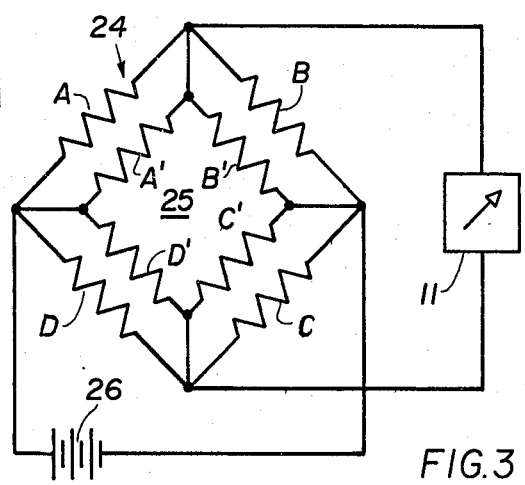
FIG. 3 illustrates a bridge circuit for use in accordance with the invention.

Referring further to FIGS. 2 and 3, the double bending beam transducer 13 comprises strain gauges A, B, C and D. These strain gauges A, B, C and D form a first bridge circuit 24, as shown in FIG. 3. A second bridge circuit 25 with strain gauges A', B', C' and D' is connected in parallel to the first bridge circuit 24. A battery 26 supplies both bridge circuits and the output of the bridge circuits is connected to the display console 11 which includes conventional amplifier means. It will be appreciated that the bridge circuit 24 is formed with the strain gauges of the transducer located at one end of the tubular member 17 whereas the bridge circuit 25 is formed with the strain gauges of the transducer located at the opposite end of the tubular member 17.

In order to eliminate any effect of the so called gravity vector on the weighing result, the hooks and eye means 19 shown in FIG. 1 permit the positioning of the stretcher 12 so that the transducer measuring axis of the two beam type transducers always coincides with the direction of the gravity vector independently of the angular position of the boom 7. The same effect may be accomplished by providing a journal means within the chain of suspending elements arranged between the stretcher 12 and the free end 10 of the boom 7. Thus, in FIG. 4, the hoop 14 is rigidly secured to the free end 15 of the transducer by means of a pin 23. However, the inner end 16 of the tranducer is connected to the tubular crossbar member 17 by means of a sleeve bearing 27. The arrangement at the opposite end of the tubular member 17 would be the same. Thus, the tubular member 17 is rotatable about its longitudinal axis relative to the transducer.

Figure 5:
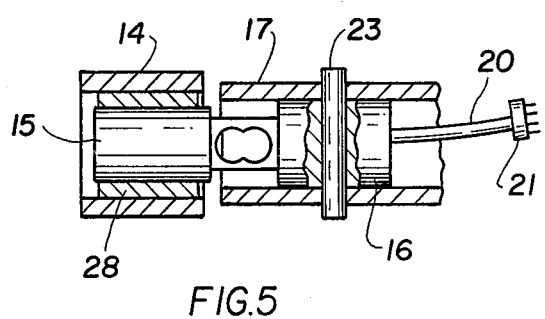
FIG. 5 illustrates a view similar to that of FIG. 4, however, with the transducer end rigidly secured to one end of a tubular member.

In FIG. 5, the inner end 16 of the transducer is rigidly secured to the tubular member 17 by means of the pin 23 but the outer free end 15 of the transducer is connected to the hoop 14 by means of a sleeve bearing 28. Again, the arrangement at the opposite end of the tubular crossbar 17 would be the same as shown in FIG. 5.

Figure 6:
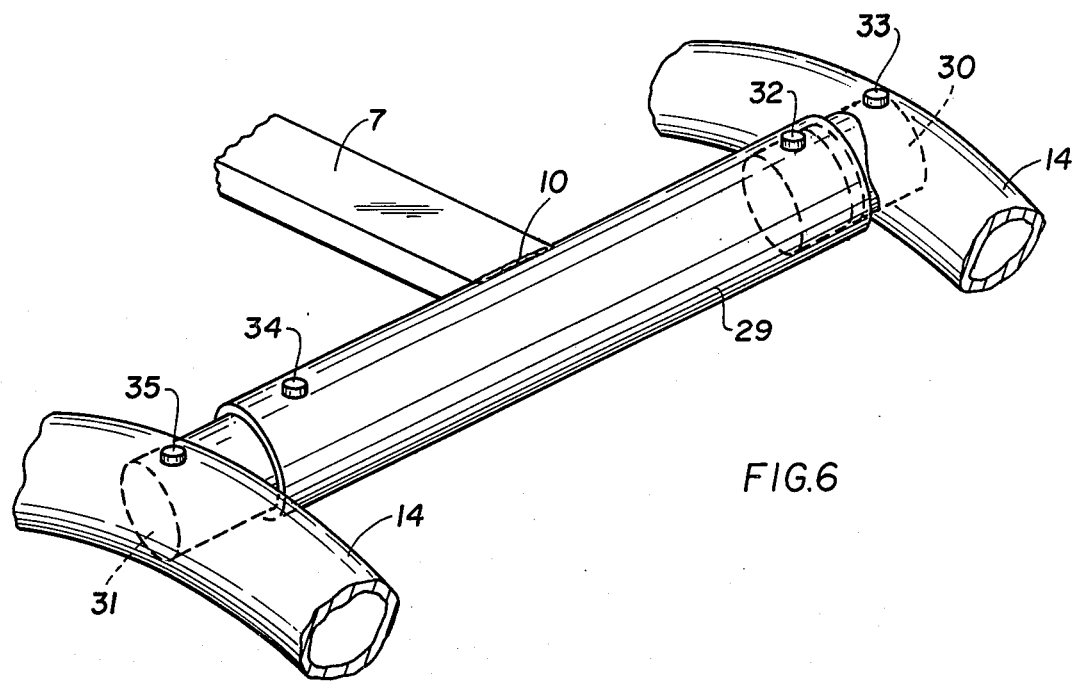
FIG. 6 is a perspective view of a tubular crossbar rigidly secured to the free end of a boom which is preferably liftable vertically up and down.

FIG. 6 illustrates a detail of another embodiment according to the invention, wherein the boom 7 is preferably movable vertically up and down. The free end 10 of the boom 7 is welded to a tubular member 29. A transducer 30 is rigidly secured to the tubular member 29, for example, by means of a pin 32. Further, the transducer 30 is also rigidly secured to the hoop 14 by means of the pin 33. Similarly, the transducer 31 is rigidly secured to the tubular member 29 by a pin 34 and to the hoop 14 by a further pin 35.

Figures 7, 8:
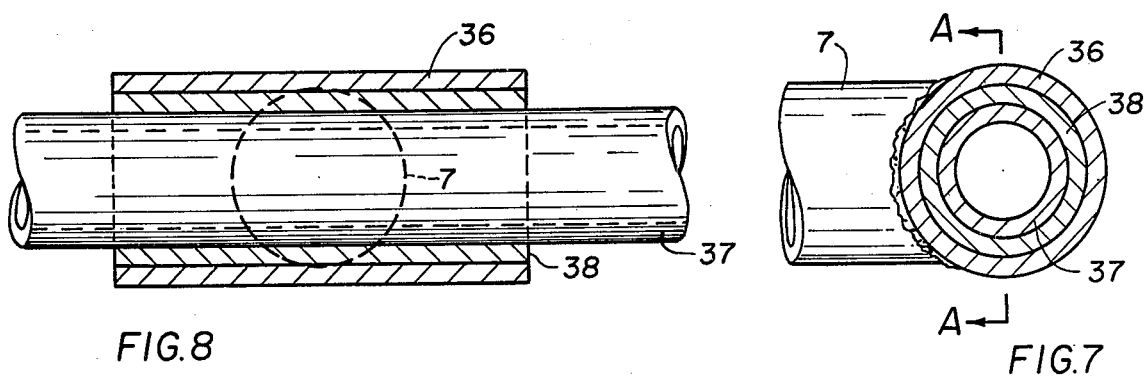
FIG. 7 is a side view, partially in section, of the crossbar journaled to the boom end.
FIG. 8 is a sectional view along the section line A—A in FIG. 7.

The embodiment of FIG. 7 illustrates another possibility of permitting the measuring axis of the transducer to coincide with the direction of the gravity vector independently of the boom angle. For this purpose a first tubular member or bushing 36 is rigidly secured to the boom 7, for example by welding. A second tubular member or crossbar 37 is rotatably supported inside the first tubular member 36 by means of a sleeve bearing 38. The outer free ends of the crossbar 37 would be provided with the transducers as described above. If desired, the two tubular members 36 and 37 may be of approximately equal length.

Figure 9:
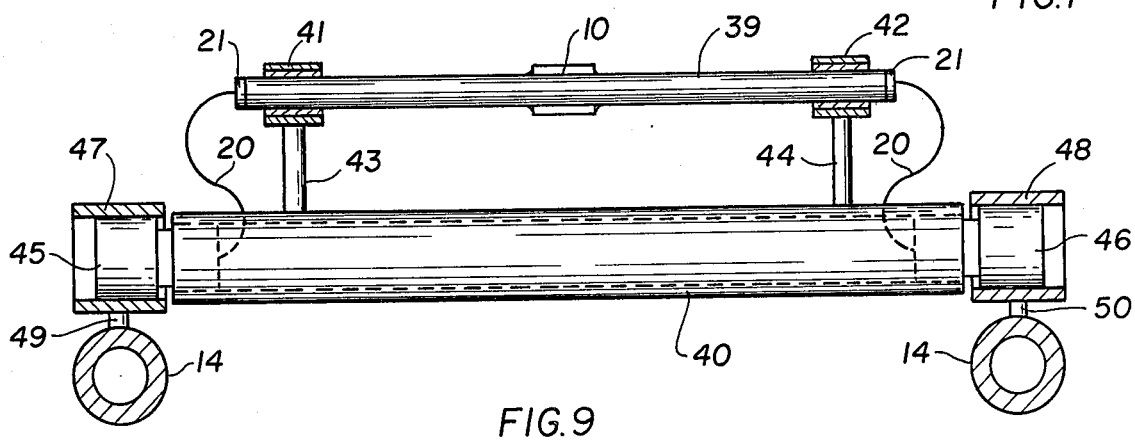
FIG. 9 is a simplified front view of a further embodiment according to the invention, wherein the transducer carrying tubular member is journaled to a further member at two positions spaced from each other.

In FIG. 9, a first tubular member 39 is secured, for example by welding, to the free end 10 of the boom 7. A second tubular member 40 is journaled to the first member 39 by means of sleeve bearings 41 and 42 connected to the tubular member 40 by cross pieces 43 and 44. Thus, the member 40 may swing about the longitudinal axis of the member 39. The respective transducers 45 and 46 are electrically connected as described above. The plug-in connectors 21 may cooperate with respective receptacles at the end of the tubular member 39. However, it is also possible to provide the receptacles in the boom 7, whereby the member 39 could be a solid bar. The hoops 14 are connected to the respective transducers by means of adapters 47 and 48 and by means of joints, such as swivel joints 49 and 50. The details of such connecting means are well known in the art.

In operation the fabric of the stretcher 12 is placed under the patient in the same manner as changing a bed sheet. Then longitudinal supporting bars are inserted into respective pockets along the edges of the stretcher fabric or sheet and the hoops 14 are connected to these longitudinal bars. Thereafter, the handle 8 is actuated a few times whereby the patient is sufficiently raised above the bed. The weight may now instantly be read by the nurse by simply pushing a button.

Although the invention has been described with reference to specific example embodiments, it is to be understood, that it is intended to cover all modifications and equivalents within the cope of the appended claims.

What is claimed is:

1. In a patient weighing scale having a frame structure, a cantilever boom having a free end and a secured end, means movably connecting said secured end of said cantilever boom to said frame structure, power means operatively arranged between said frame structure and said cantilever boom for raising and lowering the latter, support means for operatively securing a stretcher to said free end of said cantilever boom, transducer means operatively arranged for sensing a load applied to said support means, whereby the transducer means are responsive to a weight on a stretcher, and display means operatively connected to said transducer means for providing a direct weight indication, the improvement wherein said support means comprise a substantially horizontally extending tubular member (17) operatively secured to the free end of said cantilever boom, and wherein said transducer means comprise a first beam type transducer secured with one end thereof to one end of said tubular member, a second beam type transducer secured with one end thereof to the opposite end of said tubular member, each beam type transducer having a substantially horizontally extending geometrical axis and a free end extending substantially horizontally out of said tubular member, whereby a vertical force caused by said load extends substantially perpendicularly to said geometrical axis, and hoop means for connecting the respective free end of each beam type transducer to a stretcher.

2. The scale according to claim 1, wherein plug-in means are provided for disconnecting said display means, said support means permitting the removal of said stretcher means from said cantilever boom.

3. The scale according to claim 1, wherein said support means comprise a first tubular member, means rigidly connecting said first tubular member in a substantially horizontal position to the free end of said cantilever boom, a second tubular member rotatably extending through said first tubular member so that the first tubular member forms a sleeve bearing for the second tubular member which extends with its ends out of said first tubular member and both tubular members extend substantially horizontally, said first beam type transducer having an inner end and an outer end, said inner end being rigidly secured to one end of said second tubular member, said second beam type transducer also having an inner end and an outer end, said inner end of said second beam type transducer being rigidly secured to the opposite end of said second tubular member, said outer ends of said first and second beam type transducers extending axially relative to said second tubular member and therefore also substantially horizontally, said hoop means securing a stretcher to said outer ends of said first and second beam type transducers.

4. The scale according to claim 1, wherein said support means comprise a rigid longitudinal support member, means rigidly securing said support member to the free end of said cantilever boom so that the support member extends substantially horizontally, a tubular member, means securing said tubular member to said support member so that said support member and said tubular member extend substantially horizontally in parallel to each other, said securing means permitting a rotational movement of said tubular member about the longitudinal axis of said support member and substantially in parallel thereto but preventing substantially any other movement of said tubular member, said first beam type transducer having an inner end and an outer end, said inner end being rigidly secured to one end of said tubular member, said second beam type transducer also having an inner end and an outer end, said inner end of said second transducer being rigidly secured to the opposite end of said tubular member, said outer ends of said first and second beam type transducers extending axially relative to said tubular member and therefore also substantially horizontally, said hoop means securing a stretcher to said outer ends of said first and second beam type transducers.

5. The scale according to claim 1, wherein said support means comprise a tubular member having free ends, means rigidly securing said tubular member to the free end of said cantilever boom, said first and second beam type transducers each having an inner end and an outer end, first and second sleeve bearing means interposed between the inner end of the respective beam type transducer and the corresponding free end of the tubular member, said hoop means connecting the outer end of the respective beam type transducer to a stretcher.

6. The scale according to claim 1, wherein said support means comprise a tubular member having free ends, means rigidly securing said tubular member to the free end of said cantilever boom, said first and second transducers each having an inner end and an outer end, means rigidly securing said inner ends of said transducers to the respective free end of the tubular member, and first and second sleeve bearing means interposed between the respective hoop means and the outer end of the corresponding transducer.

7. The scale according to claim 3 or 4 or 5 or 6, wherein said first and second beam type transducer means are two double bending transducers responsive to vertical forces.

8. The scale according to claim 1, wherein said beam type transducers comprise two double bending beam transducers having a measuring axis extending perpendicularly to said geometrical axis, said scale further comprising journal means arranged so that said measuring axis of said first and second double bending beam transducer means extends vertically regardless of the position of said cantilever boom.

9. The scale according to claim 8, wherein said journal means comprise a sleeve bearing located at said free end of said boom.

10. The scale according to claim 8, wherein said journal means are located as part of said support means and removed from said free end of said boom.

* * * * *